United States Patent
Erad et al.

(10) Patent No.: US 10,422,851 B2
(45) Date of Patent: Sep. 24, 2019

(54) DIRECTIONAL AWARENESS FOR WIRELESS SENSOR NODES

(71) Applicant: HISEP TECHNOLOGY LTD., Yavne (IL)

(72) Inventors: Yariv Erad, Kidron (IL); Gad Vered, Beer Yaacov (IL); Menachem Erad, Ashdod (IL); Uri Vered, Rishon LeZion (IL)

(73) Assignee: HISEP TECHNOLOGY LTD., Yavne (IL)

( * ) Notice: Subject to any disclaimer, the term of this patent is extended or adjusted under 35 U.S.C. 154(b) by 0 days.

(21) Appl. No.: 15/780,810

(22) PCT Filed: Oct. 31, 2016

(86) PCT No.: PCT/IL2016/051175
§ 371 (c)(1),
(2) Date: Jun. 1, 2018

(87) PCT Pub. No.: WO2017/093996
PCT Pub. Date: Jun. 8, 2017

(65) Prior Publication Data
US 2019/0146056 A1    May 16, 2019

Related U.S. Application Data

(60) Provisional application No. 62/261,874, filed on Dec. 2, 2015.

(51) Int. Cl.
*G01S 5/02* (2010.01)
*H04W 64/00* (2009.01)

(52) U.S. Cl.
CPC ............ *G01S 5/0284* (2013.01); *G01S 5/021* (2013.01); *H04W 64/006* (2013.01)

(58) Field of Classification Search
CPC ....... H04W 24/08; H04W 4/023; H04W 4/80; H04W 84/18; H04W 12/08; G01S 5/0205; G01S 5/0263
See application file for complete search history.

(56) References Cited

U.S. PATENT DOCUMENTS 8,405,549 B2 *   3/2013   Vered ................. G01S 3/043
                                                      342/417
8,988,283 B2 *   3/2015   Erad .................. H01Q 21/29
                                                      342/432

(Continued)

OTHER PUBLICATIONS

International Search Report—PCT/IL2016/051175—dated Mar. 10, 2017.

*Primary Examiner* — Diane D Mizrahi
(74) *Attorney, Agent, or Firm* — Banner & Witcoff, Ltd.

(57) ABSTRACT

Aspects described herein provide a method for generating a directional context for measured environmental condition values. A Target device may measure at least one environmental parameter using at least one Environmental Sensor in the Target. The Target may communicate wirelessly with a Looker device to transmit the measured environmental data. The Looker device may determine a relative location of the Target versus a location of the Looker device and associate the environmental data with the relative location. The Looker device may generate a directional indication according to the received environmental data, where the directional indication associates the Target's relative location with the received environmental data.

20 Claims, 12 Drawing Sheets

(56) References Cited

U.S. PATENT DOCUMENTS

| | | |
|---|---|---|
| 2011/0025494 A1 | 2/2011 | Adcook et al. |
| 2014/0221020 A1 | 8/2014 | Xie et al. |
| 2014/0235269 A1* | 8/2014 | Ericsson ............ H05B 37/0272 |
| | | 455/456.1 |
| 2015/0340875 A1 | 11/2015 | Prasad |
| 2018/0089988 A1* | 3/2018 | Schwarzkopf ........... H04Q 9/00 |
| 2018/0314406 A1* | 11/2018 | Powderly ................ G06F 3/016 |

* cited by examiner

DIRECTIONAL AWARENESS FOR WIRELESS SENSOR NODES

CROSS-REFERENCE TO RELATED APPLICATIONS

The present application is a U.S. National Phase filing of International Application No. PCT/IL2016/051175, tithed "DIRECTIONALLY AWARENESS OF WIRELESS SENSOR NODES" and filed on Oct. 31, 2016, which claims priority to U.S. Provisional Patent Application No. 62/261,874 filed Dec. 2, 2015. The present application claims priority to and the benefit of all the above-identified applications, which are each incorporated by reference herein in their entireties.

FIELD OF INVENTION

This invention relates to the use environmental parameter sensors (such as temperature, humidity, sound/noise level, wind, air quality) together with means and techniques that enable determination of the relative position (relative direction, relative distance, relative elevation) of such sensors vs. one another.

RELATED APPLICATIONS

The present disclosure uses terms from U.S. Pat. No. 8,405,549 "Direction finding method and device", U.S. Pat. No. 8,988,283 "Direction finding system device and method", PCT patent application No.: PCT/IL2014/051008 "Apparatus and method for displaying relative location of persons, places or objects"; U.S. Provisional patent application No. 62/150,850 "Reversed DF—techniques system and methods of use"; U.S. Provisional patent application No. 62/169,575 "Methods systems and techniques to assess relative distance"; U.S. Provisional patent application No. 62/175,376 "Methods systems and techniques to assess relative distance using frequency", U.S. Provisional patent application No. 62/186,375 "DF using dipole antennas, techniques, system, and methods of use", U.S. Provisional patent application No. 62/186,396 "DF using dipole antennas and sensors—techniques, system, and methods of use"; all incorporated by reference in this invention.

BACKGROUND OF THE INVENTION

In recent years there is a growing use of wireless connectivity in almost every device. The growing usage of "Internet of Things" (TOT) technology leads to a situation in which multiple types of devices and objects can be coupled with or comprise sensors and wireless communication components for the purpose of communicating to the internet on one hand, and communicating to other items and articles in the vicinity of the devices or objects, on the other hand. The wireless communication utilized for connecting to the internet, or each other, may use a radio signal-based communication designed for to communicate with telecommunications networks such as, wireless LAN, WiMAX, GSM, GPRS, CDMA, TDMA, PAN, and the like. The type of devices and objects that may use said communications as describe above can be in a wide range of device types such as every day home appliances, electronics, furniture's, lightning, smart thermostats, home controllers and sensors, smartphones, smart watches, digital cameras, drones, cars, wearable's, clothing and apparel items, and the like.

Integrating Environmental Sensors in wearable's and in clothes enables users to collect such environmental data. But to make the collected information truly useful in real time or to give it valuable context, there is a need for the items to not only exchange gathered environmental data with other items near them—but to be able to know the relative position of these items.

SUMMARY OF THE INVENTION

The present invention discloses a method for enabling wireless sensor nodes to collect and analyze information from other sensor nodes while determining the relative direction and/or relative distance to other wireless sensor nodes using direct wireless communications. Such sensor nodes may be sensors capable of performing some processing, gathering sensory information and communicating with other connected sensor nodes via direct wireless communication. The sensor nodes may be equipped with sensors such as environmental sensors, in addition to non-sensor components such as a power source, a microcontroller to operate the sensor node and a transceiver for communications with other devices, such as other sensor nodes. The transceiver of the sensor node can comprise wireless communication capabilities. The direct wireless communication performed by the wireless sensor nodes can utilize peer-to peer methods for communicating directly between the wireless sensor nodes through diverse optional implementations such as (but not limited to) a Wi-Fi implementation, a Bluetooth implementation, Low-Energy-Bluetooth (BLE) implementation, a Wi-Max implementation, an implementation of a Near-field Communication (NFC), and the like. The wireless sensor nodes may be equipped with environmental sensors which can measure environmental conditions such as (but not limited to), temperature, air humidity, sound, noise level, wind speed, air quality, light strength, smoke level, air pressure, and the like.

Definitions

For the purposes of the description in the current invention, and in order to enable a clear understanding of the invention described herewith, the following terms shall have the meaning set forth beside them. However, it should be clearly understood, that the use of such meanings shall in no way serve to limit the scope of possible interpretation of the ideas, and the ideas and concepts provided herewith shall apply even if other terms and definitions are used. The examples provided in this paper relate to the use of the invention for various applications. However, it is clearly stated that the use of the invention can apply to other types of applications and devices, and for any device or application that use or may use wireless identification data of any type. In these cases, the features of the inventions described hereunder shall apply as well.

It is an object of the invention to disclose a method for generating a directional context to measured environmental condition values, comprising measuring by a Target at least one environmental parameter with at least one Environmental Sensor in the Target, transmitting said measured environmental data by the Target; receiving environmental data at a Looker device from a Target having at least one environmental sensor via direct wireless communication between the Looker and the Target, determining at the Looker device a relative location of the Target versus the Looker device, associating at the Looker device said environmental data with said relative location, generating at the Looker device a directional indication by the Looker according to the received environmental data, said indication associates the Target's relative location with the received environmental data. In some cases, the method further comprising collecting environmental data from at least one Environmental Sensor located at the Looker device. In some cases, the method further comprises comparing the environmental data received from the Target with environmental data collected from the at least one Environmental Sensor located at the Looker device. In some cases, the method further comprises generating a recommendation to a user of the Looker device receiving the environmental condition values according to the comparison and a predefined rule.

In some cases, the Target comprises a plurality of environment sensors. In some cases, the plurality of environmental sensors are selected from a group comprising sensors such as (but not limited to) an air temperature sensor, a light sensor, a noise level sensor, an air quality sensor, an air pressure sensor, a water temperature sensor, a water current speed sensor, a smoke sensor, an audio signature sensor and a combination thereof. In some cases, the method further comprises repeating the method and tracking changes in the environmental condition values and updating the indication according to said changes. In some cases, the method further comprises comparing the received environmental condition values to a predefined threshold.

In some cases, at least one of the plurality of environmental sensors is a sensor receiving the environmental condition values, the method further comprises generating a real time layout of the environmental conditions measured by the plurality of sensors, wherein the layout comprises the relative locations of the measured environmental condition values. In some cases, the method further comprises repeating the method and tracking changes in the environmental condition values and updating the layout according to said changes. In some cases, the layout created by the sensor comprises locations of the environmental sensors, a distance between a sensor of the plurality of sensors and the device receiving the environmental condition values. In some cases, the layout comprises deviation values between the received environmental condition values and a corresponding value measured by a sensor in the device receiving the environmental condition values. In some cases, the layout comprises density of people according to density of sensors. In some cases, the method further comprises generating instructions displayed on the layout to a desired location according to environmental preferences. In some cases, the method further comprises filtering the layout to a specific measurable environmental parameter received from the plurality of sensors.

In some cases, data may be filtered according to a difference between environmental condition Values received from the plurality of sensors. In some cases, the method further comprises generating an alert at the Looker device in case a value of the received environmental condition values is higher than the predefined threshold. In some cases, the method further comprises receiving the predefined threshold inputted by a user of the Looker device. In some cases, the relative location comprises relative altitude of a Target from the Looker. In some cases, the plurality of Environmental Sensors are identified by an ID in some cases, the plurality of Targets are embedded in objects.

In some cases, the method is performed among a plurality of Looker devices, further comprises receiving user preferences concerning a measured parameter from the users of the plurality of Looker devices and generating an indication comprising a target representing an optimal environmental condition for the plurality of users. In some cases, the method is performed among a plurality of Looker devices, further comprises the plurality of Target devices sharing the environmental condition values and targets' relative locations between the plurality of Looker devices.

In some cases, at least one of the plurality of sensors is a voice sensor identifying a predefined sound and provide an emergency signal accordingly. In some cases, at least one of the plurality of sensors is a voice sensor identifying a predefined person's voice and provide an emergency signal accordingly. In some cases, at least one of the plurality of sensors comprises a panic button.

"Wireless Communication"—shall refer to the transfer of information and/or data and/or packets (formatted blocks of data) and/or communication acknowledgment/no-acknowledgment and/or voice over long or short distances without the use of electrical conductors or "wires" but via Radio waves, at any given frequency.

The term "direct wireless communication" comprises any type of wireless communication which does not require a third party, for example communication without a server or a relay. Such communication may include peer to peer wireless communication.

"Wireless Communication Protocol and/or Standard"— shall refer to any protocol and/or standard used to conduct Wireless Communication, such as, but not limited to, wireless Information Technology, cellular communication (such as, but not limited to, GSM, GPRS, CDMA), Wireless Networks, WLAN computer communications, wireless networking standards (such as IEEE 802.11), wireless personal area networks (WPAN) and wireless mesh networks, and "Internet-of-Things". (It should be clearly stated that among such protocols, but not limited only to them, are Wi-Fi, Bluetooth, Low-Energy-Bluetooth (BLE), Wi-Max, ZigBee, Z-wave, Insteon, Cellular devices communication protocols, Near-field Communication (NFC), RFID protocols or standards). Shall also refer to the use of such protocols over any radio frequency, such as—but not limited to, UHF, HF, VHF, 2.4 GHz, 5 GHz, 18 GHz, and 60 GHz.

"Direction finder or DF or Looker" refers to a device and/or object and/or thing having Direct Wireless Communication means (such as, but not limited to, IOT), which is used to determine the relative direction from the Looker to a Target as defined herein under. Alternatively, the device is used to find whether one or more Targets are located within a desired direction from the finder. Said Looker can be a standalone device or integrated into another electronic device, either via software or hardware or a combination of both. A Looker device can also function as a Target. Said Looker may include a compass component and/or Accelerometer and/or Gyro and/or Tilt sensors and/or an AM. A Looker may include/be connected to Sensors and/or Environmental Sensors. A Looker may be a stand-alone device, connected to another electronic device, or be integrated into electronic devices.

"Target"—refers to an environmental sensing device and/or object and/or thing having Direct Wireless Communication means (such as, but not limited to, IOT), or an RF communication source, which comprises RF transmitter and/or receiver and/or repeater or transponder and/or tag, which communicates wirelessly directly (i.e., not via relays) with the DF. A Target device can also function as a Looker. Said Target may include a compass component and/or Accelerometer and/or Gyro and/or Tilt sensors. A Target may include/be connected to Sensors and/or Environmental Sensors.

"Identification Data or ID"—shall refer to a number, either serial or other, a name, a collection of symbols, or any other type of reference used to provide an electronic device a unique identification, which enables users and/or systems to identify, track, monitor, and operate the device. The ID may be originally provided by the devices manufacturers, may be assigned to it by a computer system, may be assigned by a user, or may be used simply to associate a unique description by a user to the device. A device may also have more than one ID's assigned to it (for example, by the manufacturers, by the system, and by the user). A device may also broadcast different IDs at different statuses (for example, ID1 for "stand-by", ID2 for "operating");

"Sensors"—shall refer to any type of sensors, such as, but not limited to, Barometer, pressure sensors, light sensors, medical sensors, touch sensors, etc.

"Environmental Sensors"—shall refer to sensors capable of measuring various parameter of an environment (but not parameters associated with a human user—such as medical, physiological etc.), such as (but not limited to)—temperature, light conditions, humidity in the air, noise level, air pressure, wind speed, air quality (for example, cigarette smoke), etc.

In the method disclosed in the present invention, the Looker determines the relative directions of other wireless sensor nodes that may be described and named as a Targets. The looker is not required to have sensors, while the Target of the present invention has at least one environment sensor. For example, a Looker may comprise a wireless sensor node measuring humidity, implemented or embedded in a person's shirt. The direction finder may detect other wireless sensor nodes measuring humidity levels, determine their relative directions, and then may generate a synoptic layout of the humidity levels in the environment of the Looker. The direction finder may repeat the detections of the relative directions in real time, and in case the wireless sensor nodes have changed their positions the direction finder can detect the position changes and update the synoptic layout accordingly. The wireless sensor nodes transmitting their environmental data and communicating with the direction finder may be described and named as Targets.

The wireless sensor nodes of the present invention may be attached to wearables, personal devices, clothing items and accessories, home appliances, electronic devices, furniture's, lightning, smart thermostats, home controllers and sensors, computerized devices, digital devices, drones, cars, and the like. In some cases, the wireless sensor nodes may be attached to devices or objects comprising components embedded with IOT technology. In some other cases, the wireless sensor nodes may also be attached to objects or devices with components operating relative distance and/or relative location techniques. For example, a user attending a coffee shop wearing a shirt with a Looker comprising a wireless sensor node equipped with a temperature sensor, may use relative distance and/or relative location techniques to determine the relative position of a Target equipped with a temperature sensor measuring a temperature that is higher or lower than in the Looker's current location. Thus, the Looker's wireless sensor nodes may be able to compare the temperatures of each other, determine the directions to the Target and identify the relative position of a Target which has the lowest, most desired or the highest temperature.

The method disclosed in the present invention also comprises the option for a direction finder to become a target and the option of a target to become a direction finder. In some other cases, a target and/or a direction finder may be equipped with more than one environmental sensors or more than one type of environmental sensors. For example, two wireless sensor nodes can communicate with each other and function either as a target, or as a direction finder.

The method disclosed in the present invention is also designed to maintain privacy and confidentiality of the users utilizing the devices or the objects comprising the wireless sensor nodes. In some cases, the information gathered by the wireless sensor nodes may not be associated with a specific person. Thus, by utilizing direct wireless communication methods, the Looker can determine the relative directions of Targets that transmit some of the data gathered by them regardless to their user's identity, in order to ensure privacy.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

It should be explicitly understood and stated that the problems, solutions and inventions described hereunder are relevant, under the required differences, to any sort of applications, which utilize any type of wireless communication. It should be noted that any possible use in which a Looker is also a Target and vise-versa is within the scope of the invention, and an inherent part of it. It should also be explicitly stated and understood that by referring to HISEP's techniques, the inventors are referring to any type of application, which can utilize HISEP's techniques with wireless sensor nodes.

Figure 1A:
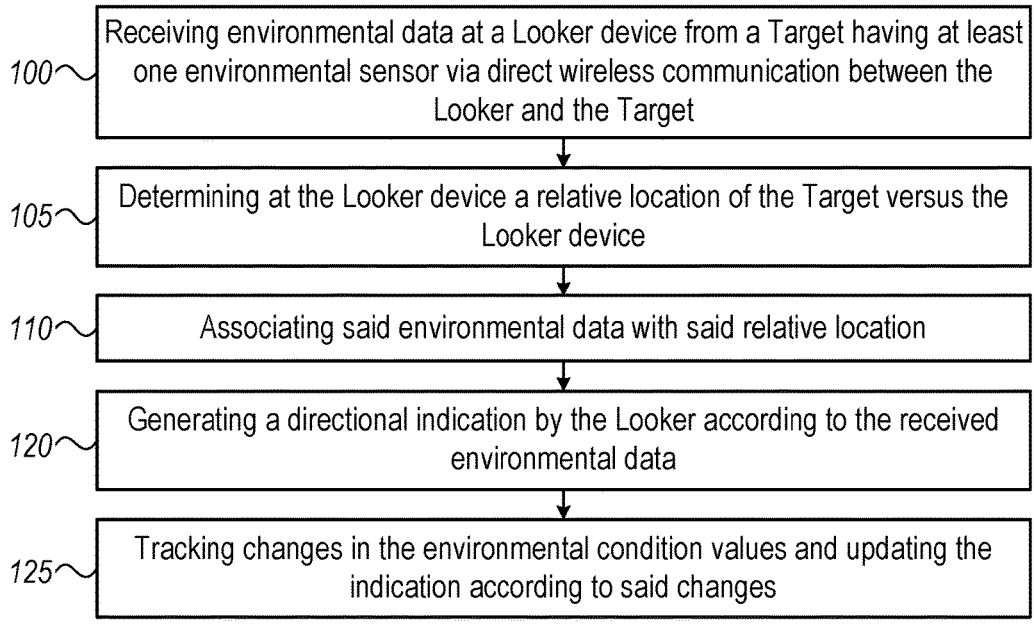
FIG. 1A shows a method for a looker to analyze measured environmental condition values received from Targets having environmental sensors and determine the target's relative locations, according to exemplary embodiments of the present invention.

FIG. 1A shows a method for a looker to analyze measured environmental condition values received from Targets having environmental sensors and determine the target's relative locations, according to exemplary embodiments of the present invention. The method disclosed in FIG. 1A is performed at the Target side. Step 100 discloses receiving real time environmental data at a Looker device from a Target having at least one environmental sensor via direct wireless communication between the Looker and the Target. Step 105 discloses determining at the Looker device a relative location of the Target versus the Looker device. Step 110 discloses associating said environmental data with said relative location. Such association may be performed according to the ID of the Target device. Step 120 discloses generating a directional indication by the Looker according to the received environmental data. The indication may be visual, for example on a display of the Target device or projected from the Target device to a surface such as a wall or a floor. The indication may be audible, for example textual, such as "to your left, humidity level of 90 percent". The indication may be audio, visual, a vibration in a mobile electronic device and the like. The indication may be a yes/no indication, indicating the user that either a predefined condition exists or not. For example, the condition may be whether or not another sensors sensed temperature that is lower by 4 or more degrees than the temperature sensed by the Looker sensor. For example, another condition may be whether a sensor sensed a dangerous level of toxic materials. In some cases, the indication may be generated according to the user's position, for example vibrate only when the indication is in front of the user, according to the determined relative direction of the Target sensors. Step 125 discloses tracking changes in the environmental condition values and updating the indication according to said changes. Such update may be sent from the Target upon request from the Looker, or periodically for example once every 12 seconds, or in response to a predefined event, such as rapid change in measurements.

Figure 1B:
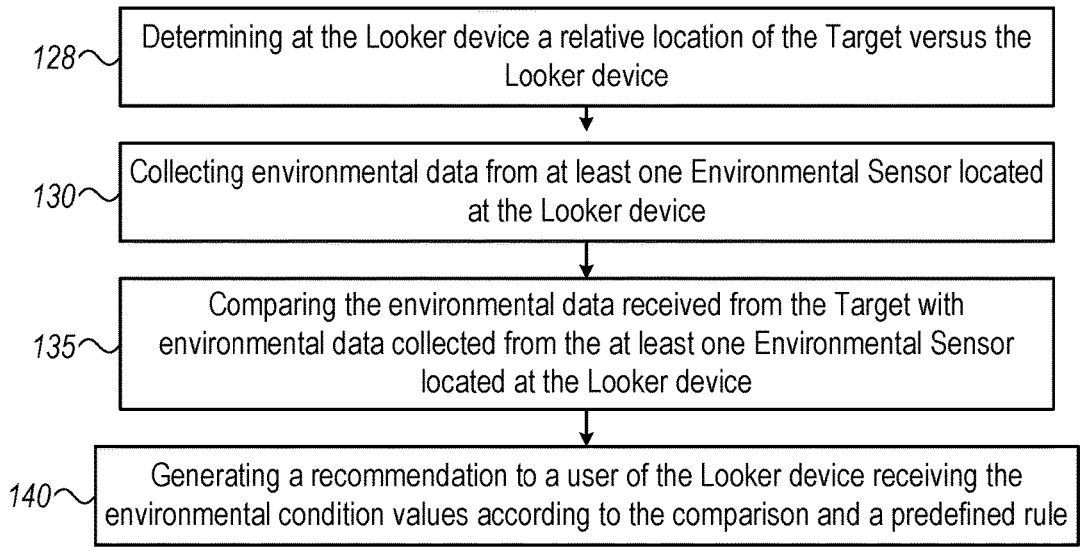
FIG. 1B shows a method for a looker to measure environmental values and compare them with measured environmental condition values received from Targets, according to exemplary embodiments of the present invention.

FIG. 1B shows a method for a looker to measure environmental values, compare them with measured environmental condition values received from Targets, and determine the relative locations of these targets vs the Looker, according to exemplary embodiments of the present invention. Step 128 discloses determining at the Looker device a relative location of the Target versus the Looker device. Step 130 discloses collecting environmental data from at least one environmental sensor located at the Looker device. Before step 135, the Looker device determines the relative direction of the one of more Target devices, and receives the environmental data associated with each of the one of more Target devices. Step 135 discloses comparing the environmental data received from the Target with environmental data collected from the at least one environmental sensor located at the Looker device. The result of the comparison may be the differences in measurements, for example the Target measured 3 degrees Celsius more than the Looker. In some cases, the method is performed as the Looker receives environmental values from two or more Targets, and the comparison is among at least three devices, the Looker and two or more targets. The result of the comparison may be an indication of which device is closer to the average value measured, which is maximal, which value is minimal, which value is closest to a predefined user preference or predefined benchmark and the like. Step 140 discloses generating a recommendation to a user of the Looker device receiving the environmental condition values according to the comparison and a predefined rule. Such predefined rule may change according to a season, time of the day, an event, or by the user of the Looker device. An example of such Rule may be "show me the relative location of the device measuring minimal air pollution, regardless to other measurements". Another exemplary rule may be "provide a relative direction indication of the device that measured minimal humidity value".

Figure 1C:
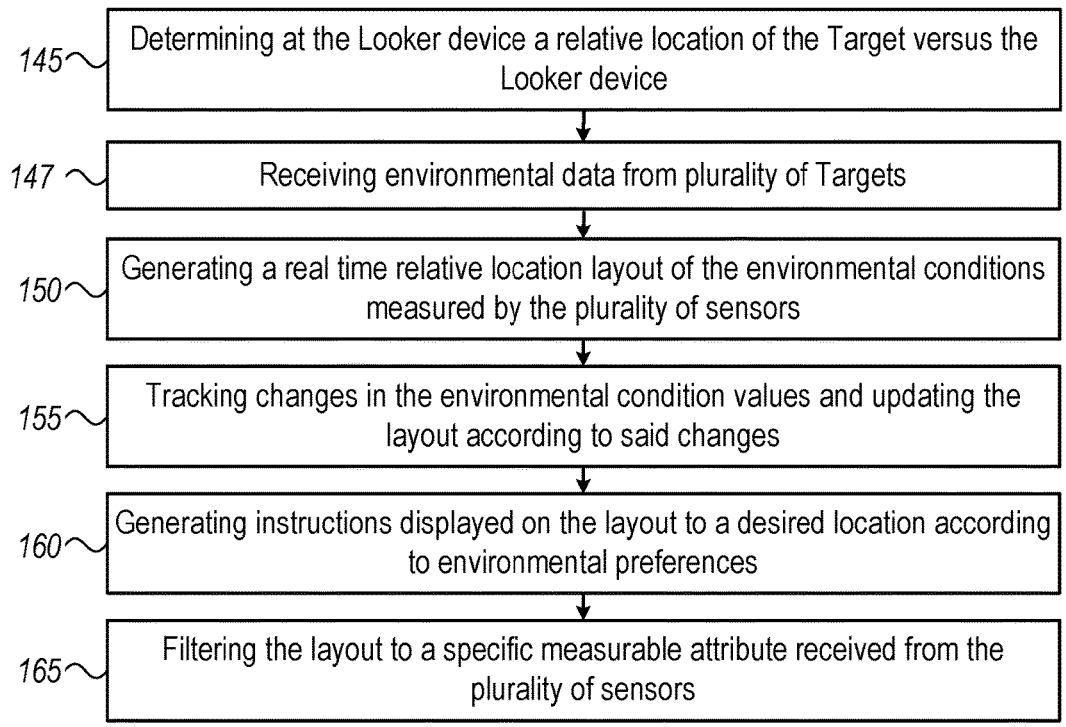
FIG. 1C shows a method for a looker to generate a layout according to measured environmental condition values received from Targets, according to exemplary embodiments of the present invention.
Figure 1D:
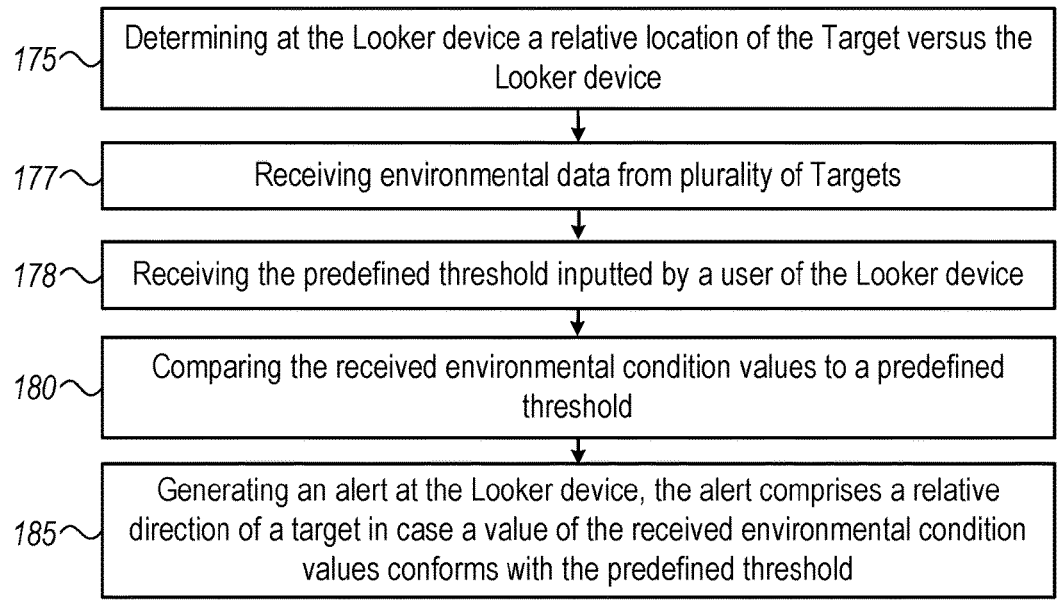
FIG. 1D shows a method for comparing the received environmental condition values to a predefined threshold, according to exemplary embodiments of the present invention.

FIG. 1C shows a method for a looker to generate a layout according to measured environmental condition values received from Targets, according to exemplary embodiments of the present invention. The layout is generated after the Looker device determines the relative location of the one of more Target devices and receives the environmental data associated with each of the one of more Target devices. Step 145 discloses determining at the Looker device a relative location of the Target versus the Looker device. Step 147 discloses receiving environmental data from a plurality of Targets. Step 150 discloses generating a real time relative location layout of the environmental conditions measured by the plurality of sensors. Step 155 discloses tracking changes in the environmental condition values and updating the layout according to said changes. Step 160 discloses generating instructions displayed on the layout to a desired location according to environmental preferences. Step 165 discloses filtering the layout to a specific measurable parameter received from the plurality of sensors.

FIG. 1 D shows a method for comparing the received environmental condition values to a predefined threshold, according to exemplary embodiments of the present invention. The comparison is performed after the Looker device determines the relative location of the one of more Target devices and receives the environmental data associated with each of the one of more Target devices. Step 175 discloses determining at the Looker device a relative location of the Target versus the Looker device. Step 177 discloses receiving environmental data from a plurality of Targets. Step 178 discloses receiving the predefined threshold inputted by a user of the Looker device. Step 180 discloses comparing the received environmental condition values to a predefined threshold. Step 185 discloses generating an alert at the Looker device in case a value of the received environmental condition values is higher than the predefined threshold.

Figure 2:
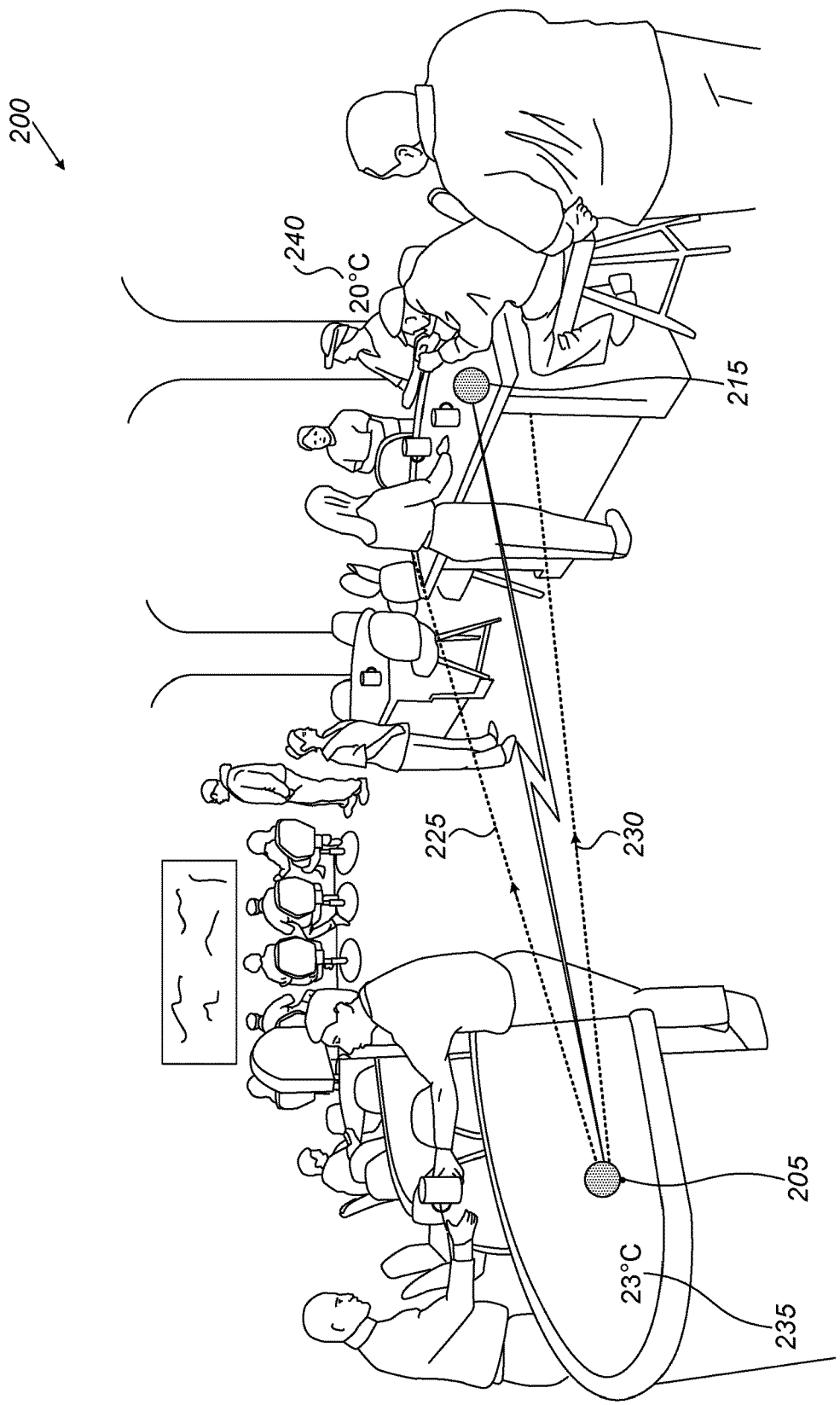
FIG. 2 illustrates a direction finder determines the relative position of a target equipped with a temperature sensor, according to exemplary embodiment of the present invention.

FIG. 2 illustrates a Looker that determines the relative location of a target equipped with a temperature sensor, according to exemplary embodiments of the present invention. FIG. 2 shows a coffee shop 200 area in which a Looker 205 may be equipped with a sensor for measuring the temperature at its vicinity. The Looker 205 may be able to detect a Target 215, located within direct wireless communication range, receive from the Target 215 data regarding measured temperatures, and determine the relative location to the Target 215.

FIG. 2 demonstrates the sign 20C 240 which manifests the temperature degree measured by the Target 215. The wireless sensor nodes embedded in Target 215 may transmit the gathered information to another device, for example, a Looker located in its direct wireless communication range 205.

FIG. 2 also shows lines 225 and 230 range towards which the Looker 205 is directed when indicating the measurements of the target 215. The lines illustrate the relative direction of target embedded in computerized mobile device 215. For example, direction finder 205 may capture the information transmitted from the target 215 and determine its relative position. Lines 225, 230 also illustrate the direction associated with a measurement of an environmental property, as shown by a sign $23^C$ 235 which demonstrates the temperature degrees received by the Looker 205 from the target 215. For example, the direction finder 205 may look for a place with a temperature degree which is higher or lower than the temperature degree in its current position. The direction finder 205 may detect that the target's sensor 215 measured a temperature level which is suitable to the preference. Thus, the direction finder 205 may determine the relative position of the target 215 and present it to the user operating the looker 205. The data received by the looker 205 can be presented to the user via audio, text, visual, vibration or any other type of indication known in the art.

In some cases, the coffee shop area 200 may comprise multiple targets having similar environmental sensors as in target 215 and the direction finder 205 may need to compare the results received from multiple targets, and identify the target that best meets the requirements. For example, when the said environmental sensor is a temperature sensor, such requirements may be a precise temperature degree, a range of temperatures, preferred condition (colder/warmer) and the like.

In some other cases, the direction finder 205 may receive diverse environmental condition types captured by diverse targets, such as noise level, humidity, wind speed, and the like.

The method disclosed in the present invention is also designed to support cases in which the target 215 changes its location. In such a case, the newly measured temperature (for example) may be transmitted to the direction finder 205.

Figure 3:
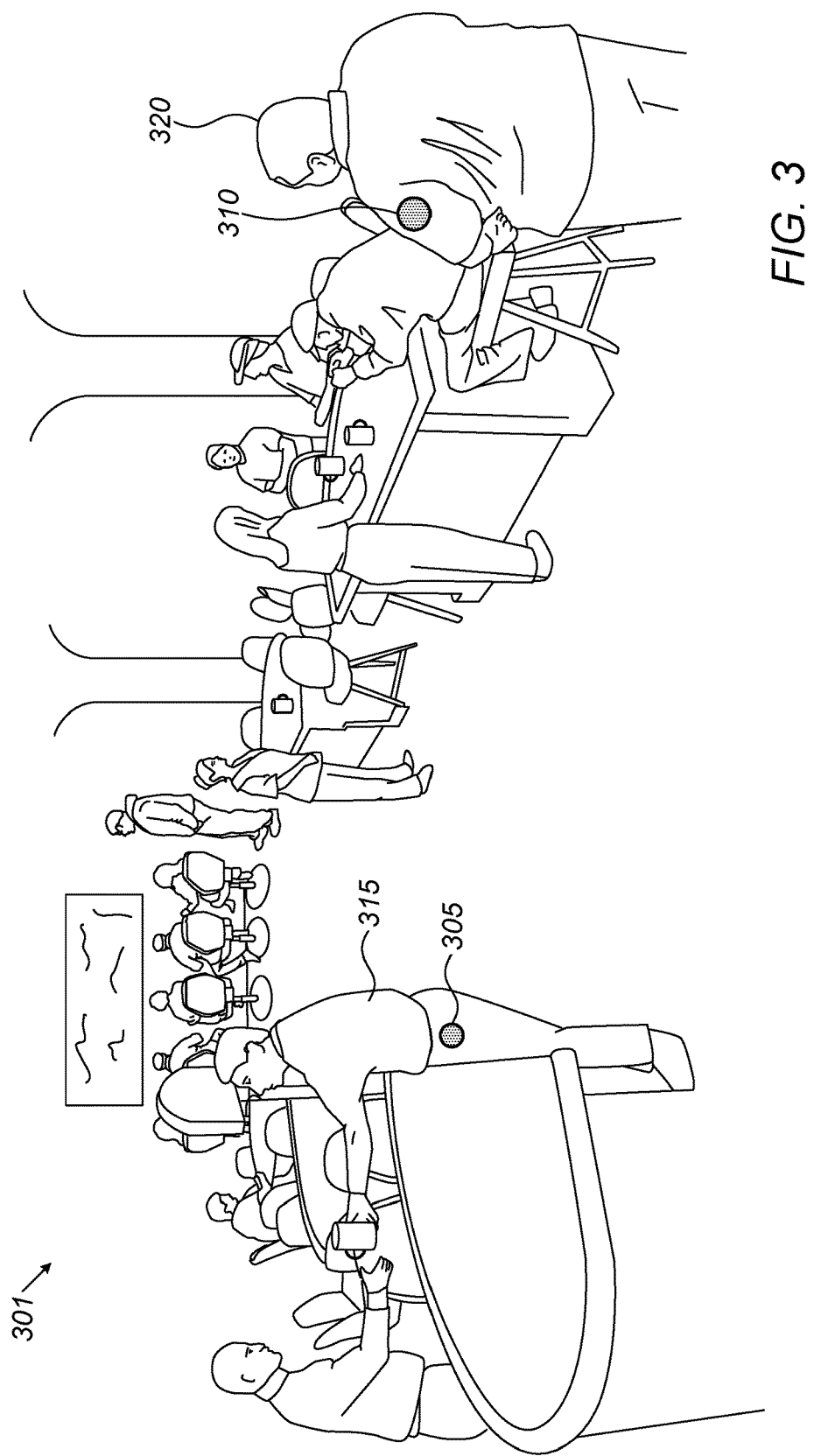
FIG. 3 illustrates a direction finder and a target, integrated to wearables, according to exemplary embodiment of the present invention.

FIG. 3 illustrates a Looker and a target, integrated to wearables, according to exemplary embodiment of the present invention. FIG. 3 shows a restaurant area 301 comprising multiple places for people to sit and dine. FIG. 3 also shows a Looker 310 embedded in or attached to a person's 320 shirt. The Looker 310 is designed to receive environmental information from other targets. FIG. 3 also shows a target 305 embedded in another person's 315 shirt. Target 305 is designed to measure environmental conditions and transmit the information to the Looker 310. In some cases, the target 305 and the Looker 310 may be able to switch roles, so a target 305 may become a Looker and Looker 310 may become a target. In some other case the Looker 310 can become both a Looker and a target, and the target 305 can become both a target and a Looker. For example, Looker 310 may measure and transmit the wind speed in the vicinity of person 320, and receive the information regarding the temperature level from other targets. In a similar manner, target 305 may measure and transmit information on the temperature level to other Lookers and receive information on the strength of the wind from other targets. In some cases, the information captured by the wireless sensor nodes may also be transmitted to a remote computer which can store the information. Such a remote computer may be a server, a personal computer, a virtual computer, a cloud service, an internet service, and the like.

Figure 4:
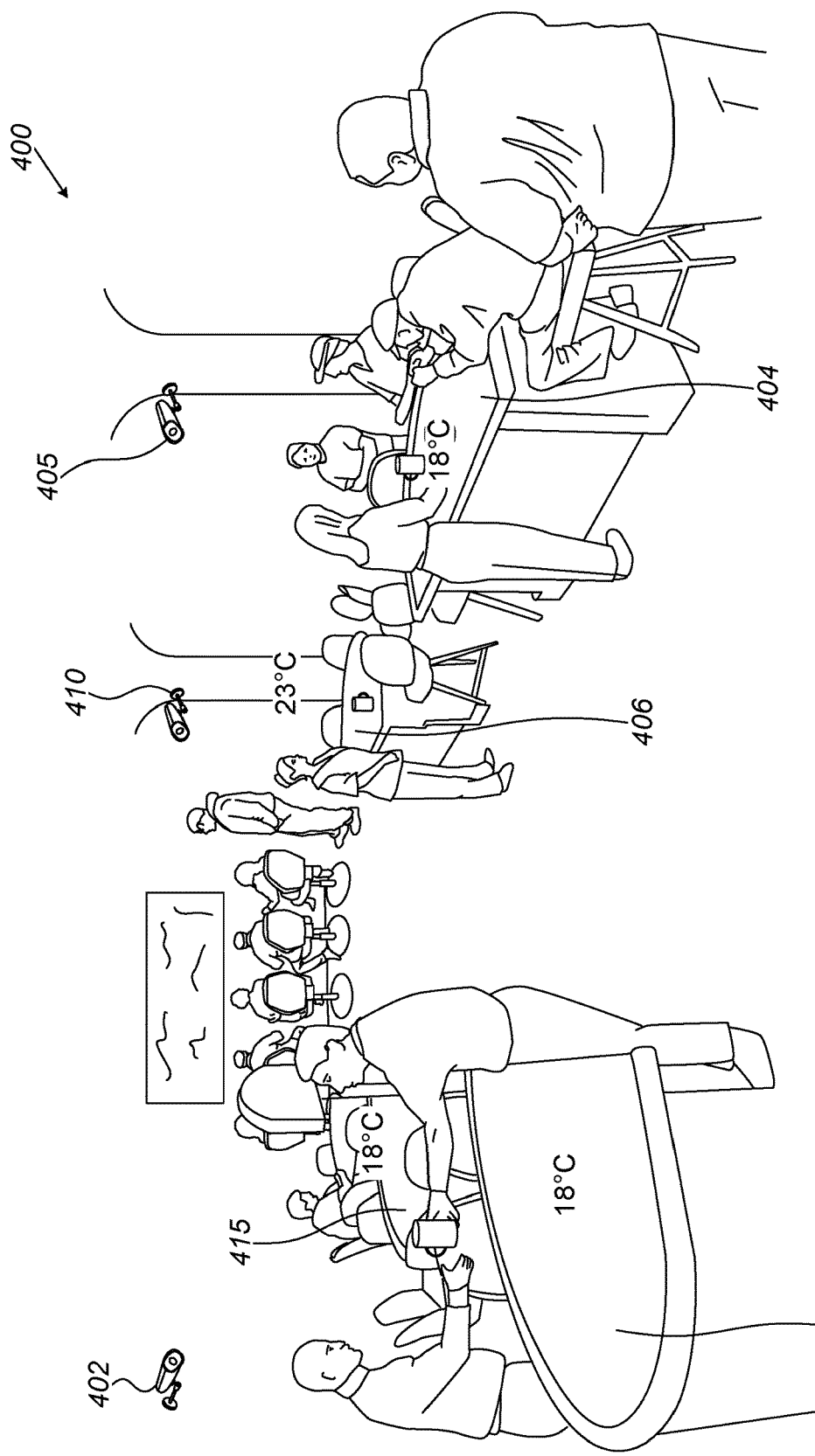
FIG. 4 shows a plurality of targets measuring temperatures within a coffee shop, according to exemplary embodiments of the present invention.

FIG. 4 shows a plurality of targets measuring diverse type of environmental conditions within a coffee shop area, according to exemplary embodiments of the present invention. FIG. 4 illustrates a coffee shop area 400, as an example of an area in which wireless sensor nodes operate. FIG. 4 also shows targets 410, 402, and 405 designed to measure the strength of the wind within the coffee shop area 400 (for example, wind created by the air-conditioning system in the area) and transmit the information to a Looker located in the area 400. The targets 410, 402 and 405 may be attached to the walls, the furniture, and to other components in the coffee shop 400. In some cases, the environmental sensors equipped by targets 410, 402, or 405 can be replaced with any other environmental sensors such as air humidity, smoke level, temperature, smoke detector, and the like. In some cases, any of the target, 410, 402, 405, 406, 415, and 404 can also become a Looker. A target 403 may be embedded in a table at the coffee shop and measure the temperature level in the vicinity of the table.

Figure 5A:
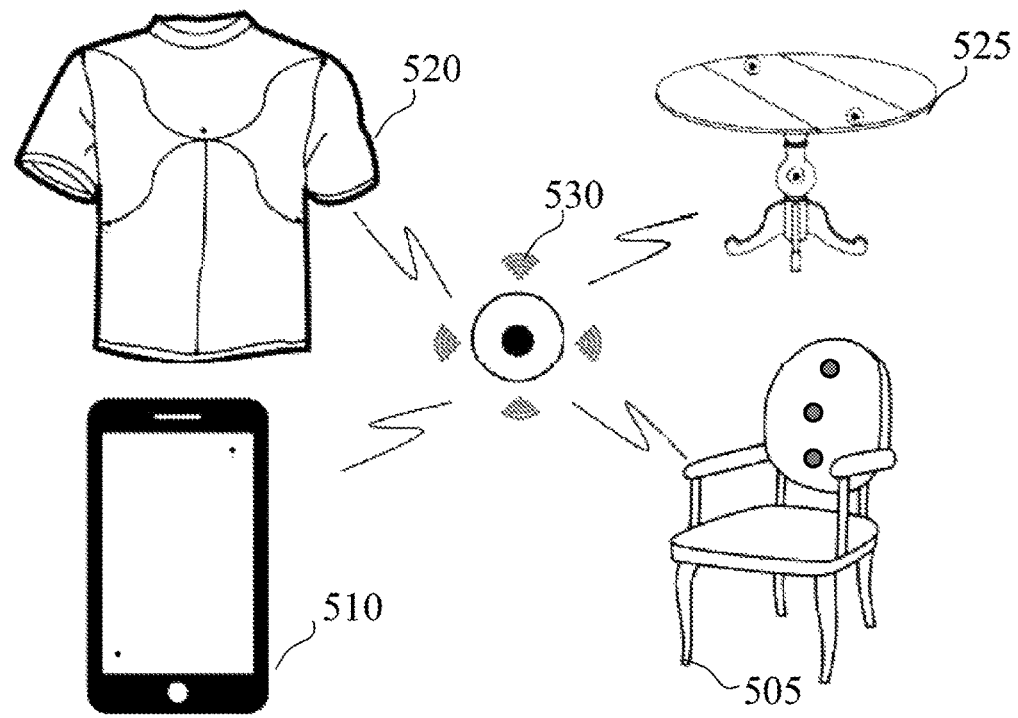
FIG. 5A demonstrates a plurality of targets and a plurality of direction finders embedded in diverse object types, according to exemplary embodiments of the present invention.

FIG. 5A shows a plurality of objects in which targets and Lookers may be embedded or attached to, according to exemplary embodiments of the present invention. FIG. 5A shows a target or a looker 530 which can be embedded in an object. FIG. 5A shows a shirt 520 in which the target or looker 530 can be embedded. In some cases, the shirt 520 can be replaced with other wearables as disclosed above. FIG. 5A also comprise a table 525 in which target or looker 530 can be embedded. FIG. 5A also shows a chair 505 and a mobile telephone 510 that can a target or looker can be embedded in 530. In some cases, the target or looker 530 may be equipped with more than one environmental sensor.

Figure 5B:
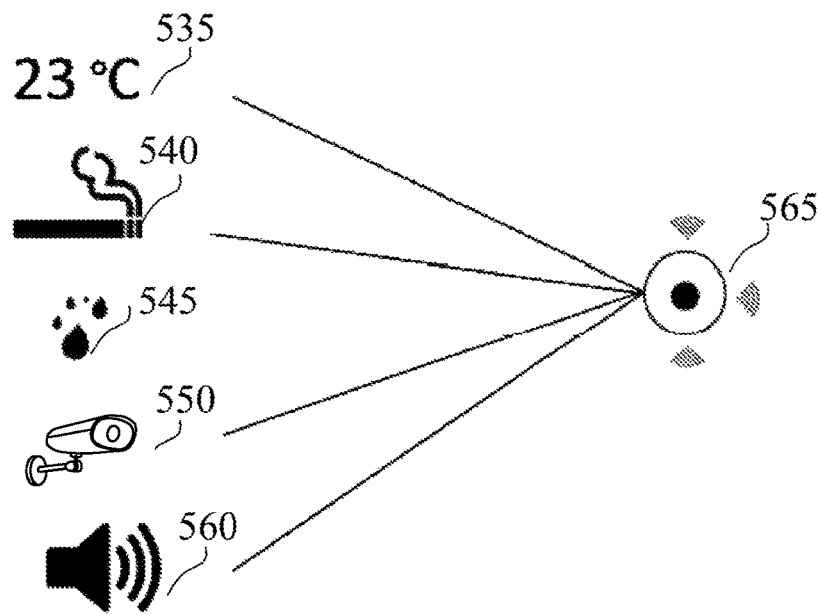
FIG. 5B shows multiple types of environmental sensors which can be equipped by wireless sensor nodes, according to exemplary embodiments of the present invention.

FIG. 5B shows multiple types of environmental sensors which a target or looker may be equipped with, according to exemplary embodiments of the present invention. FIG. 5B illustrates a possible target or looker 565 which can be equipped with multiple sensor types. Said possible target 565 is capable to measure and transmit the environmental conditions, as disclosed in FIG. 2. Said target or looker 565 can be equipped with more than one type of environmental sensors, for example (but not limited to) environmental sensor 535 designed to measure the air temperature, an environmental sensor 540 designed to measure the smoke level in the air, an environmental sensor 545 designed to measure the humidity in the air, an environmental sensor 550 designed to measure the wind speed, and the environmental 560 designed to measure the noise level. The target 565 transmits the environmental data along with an ID number or value that enables the Looker to recognize the target. Additionally, in some cases the ID represents a type of object associated with an environmental sensor type or with a target object type, for example window, shoe, television and the like.

Figure 6:
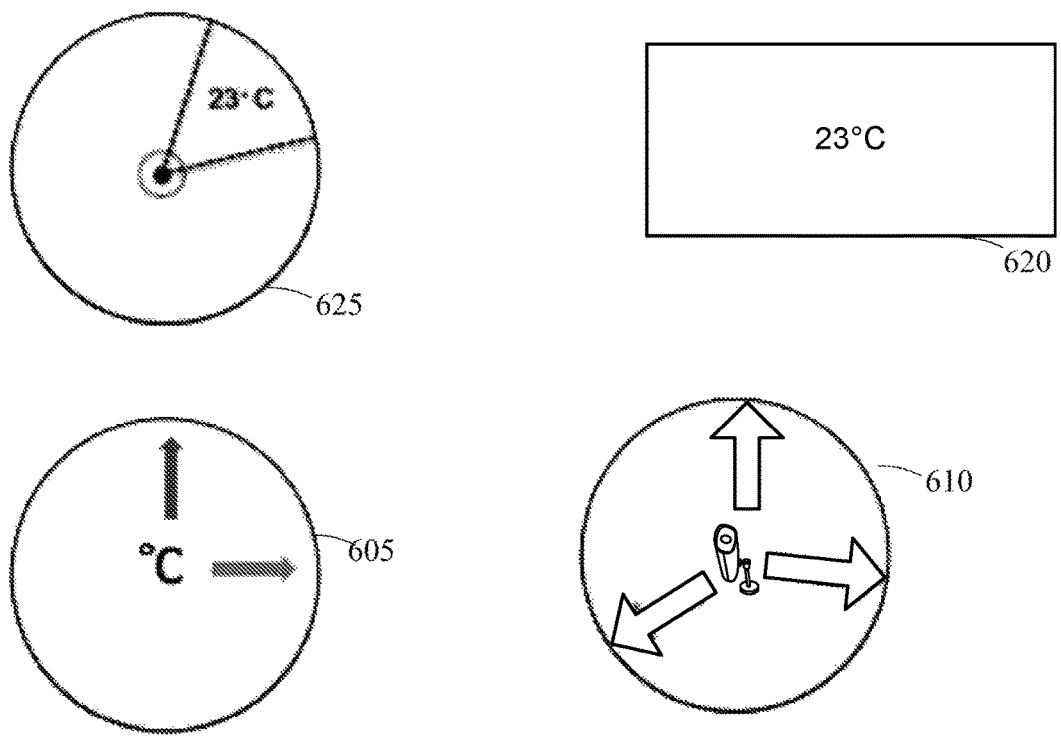
FIG. 6 illustrates number of optional user interfaces which can be used in order to present the data measured by the targets, and the information determined by the direction finders, according to exemplary embodiments of the present invention.

FIG. 6 illustrates a number of optional user interfaces 605, 610, 620, 625 which can be used in order to provide indications and/or display information to the user of the looker regarding the environmental data measured by the targets, and/or indications or information regarding the relative location of a target vs. the looker, according to exemplary embodiments of the present invention. FIG. 6 shows a looker's digital interfaces 605, 610, 620, 625 which can present the temperature measured by the target. The digital interface 620 may present the temperature detected by a target located in the vicinity of the Lookers. In some other cases, the looker's interface 605, 610, 620, 625 may be able to also present the temperature measured by the Lookers. In some cases, the interface 605, 610, 620, 625 may be in a computer software application operating in a computerized device.

Figure 7:
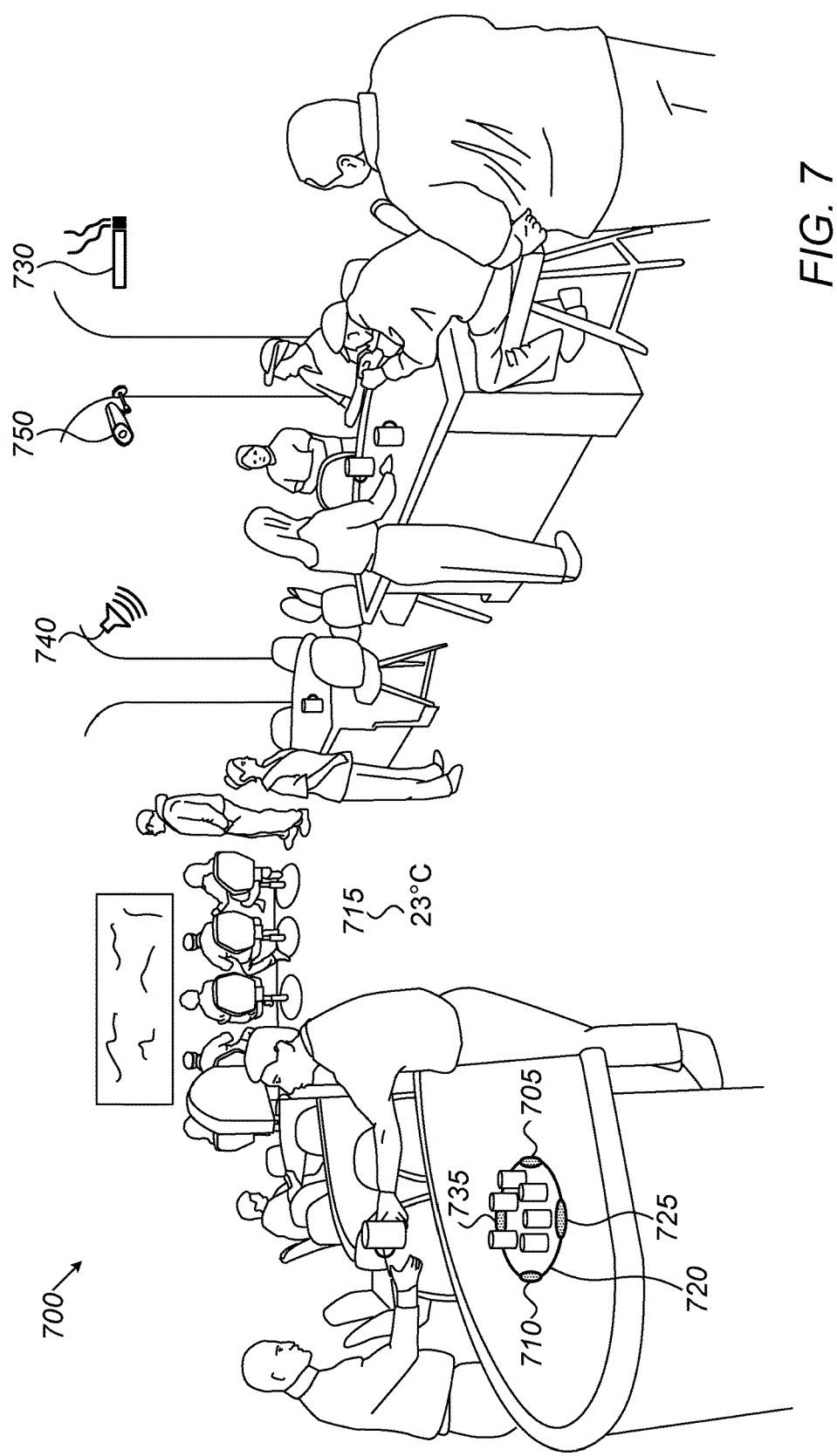
FIG. 7 illustrate a direction finder embedded in a food tray which receives data transmitted by targets located in a room, according to exemplary embodiment of the present invention.

FIG. 7 illustrates a Looker embedded in a food tray which receives data transmitted by targets located in a room area, according to exemplary embodiment of the present invention. FIG. 7 shows a dining room area of a restaurant 700, with a plurality of targets embedded in various objects within the restaurant 700. FIG. 7 also shows targets 715, 730, 740, and 750 that measure environmental conditions. FIG. 7 also shows a food tray 720 designed to carry food, said food tray 720 may comprise an embedded Looker communicating with targets 715, 730, 740, and 750. Food tray 720 also comprises lighting devices 710, 725, 705, and 735, such as LED's, lamps, and the like. In some cases, the lighting devices 710, 725, 705, and 735 may be designed to be the interface to the Looker embedded in food tray 720. Thus, the Looker embedded in food tray 720 may be able to light the lightening devices at the relative direction of the target which measures the environmental condition which is suitable to the person's preferences. For example, in case the Looker embedded in food tray 720 measures the level of the noise within the restaurant 700, the Looker embedded in food tray 720 may light the lightening device in the relative direction in which the level of noise determined to be the lowest.

Figure 8A:
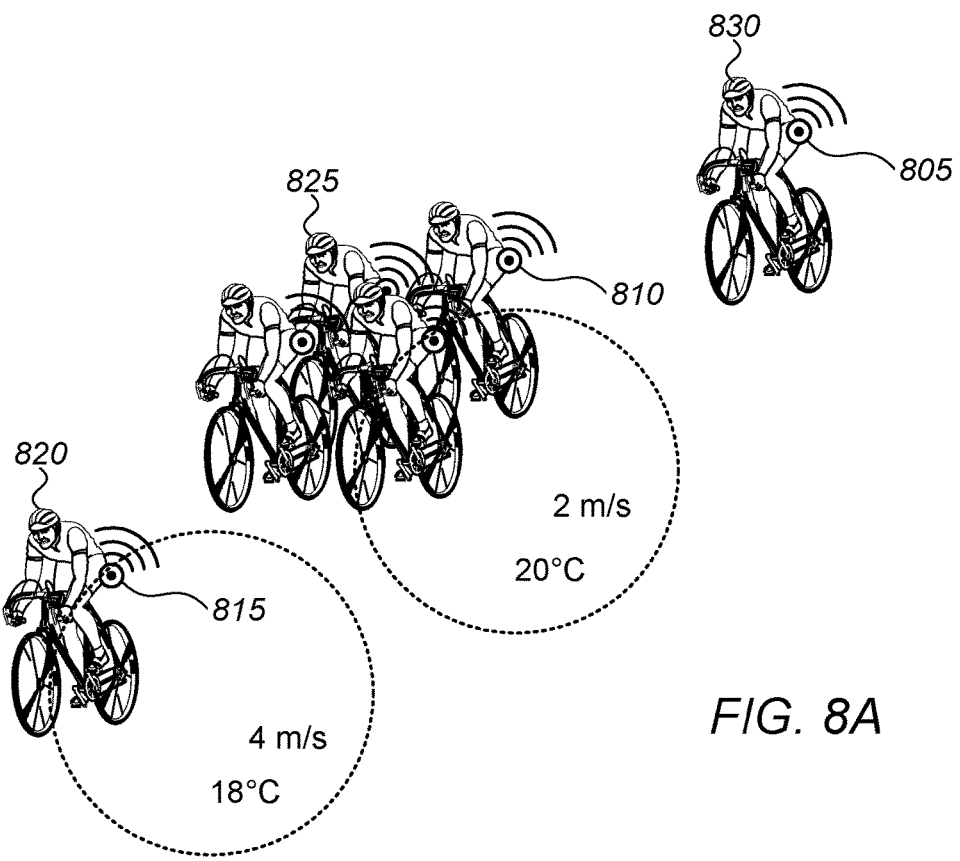
FIG. 8A shows a usage of targets and direction finders by a group of bicycle riders, according to exemplary embodiment of the present invention.

FIG. 8A shows a usage of targets and Looker by a group of bicycle riders, according to exemplary embodiment of the present invention. FIG. 8A shows bicycle riders 820, 825 and 830 which are riding bicycles. FIG. 8A also shows targets 815, 810, and 805 which may be equipped with environmental sensors. The targets 815, 810, and 805 may be embedded in the riders' cloths. In some cases, any of the targets 815, 810, or 805, may be embedded in the bicycles of one of the riders. In some other cases, any of the targets 815, 810 or 805, can become a Looker. The relative location of the riders, and hence the targets, may be updated frequently.

Figure 8B:
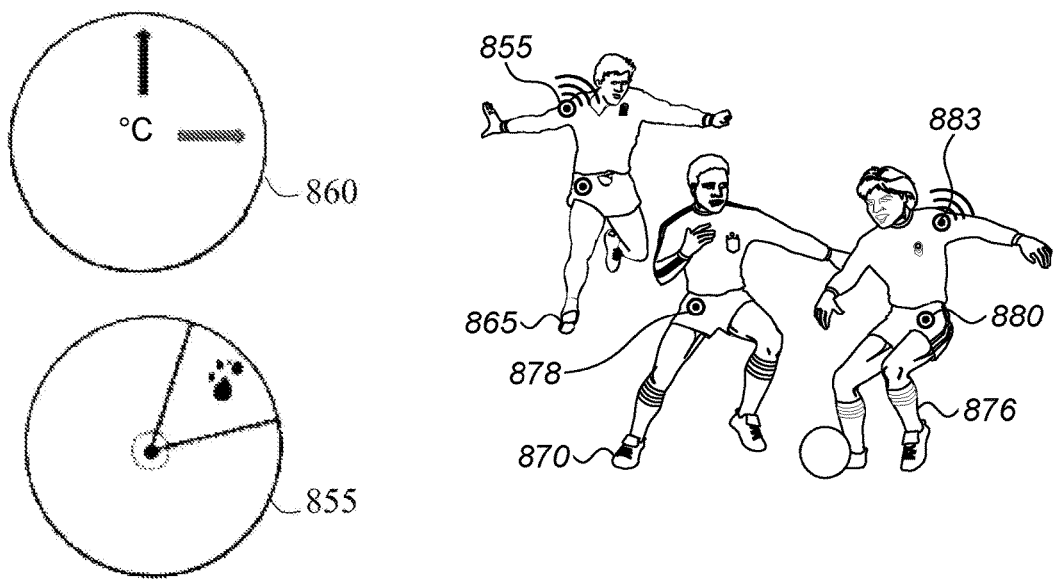
FIG. 8B shows a usage of target and direction finders by a group of soccer players, according to exemplary embodiment of the present invention.

FIG. 8B shows a usage of target and direction finders Lookers by a group of soccer players, according to exemplary embodiment of the present invention. FIG. 8B shows soccer players 865, 870, and 876 which are wearing clothes which may be embedded with targets or direction definers. FIG. 8B also discloses targets 883, 880, 855, and 878, as well as round interfaces 860 and 855.

Figure 9B:
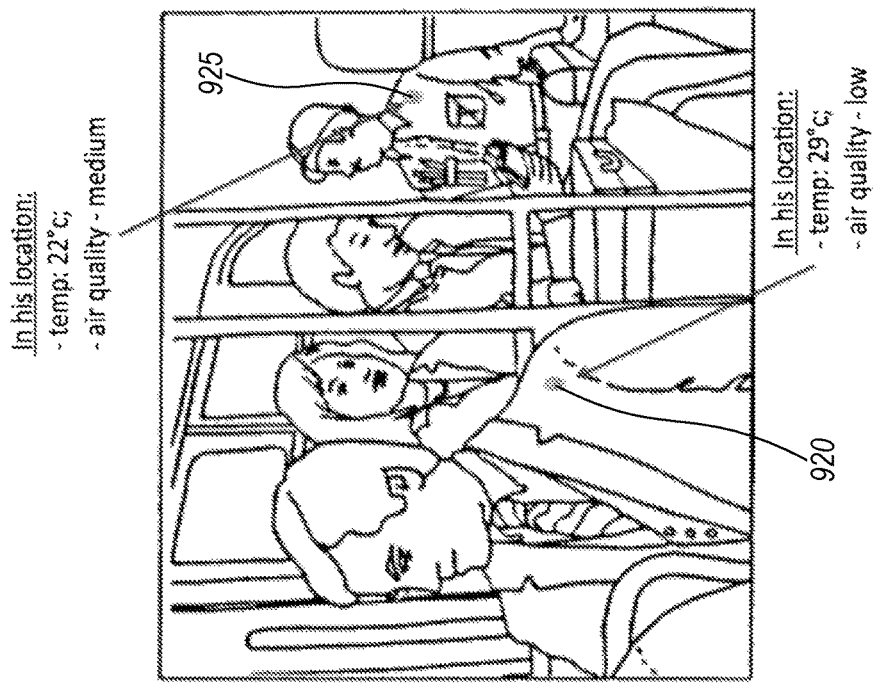
FIG. 9B, shows two people within a bus with targets embedded to their clothes, according to exemplary embodiments of the present invention.
Figure 9A:
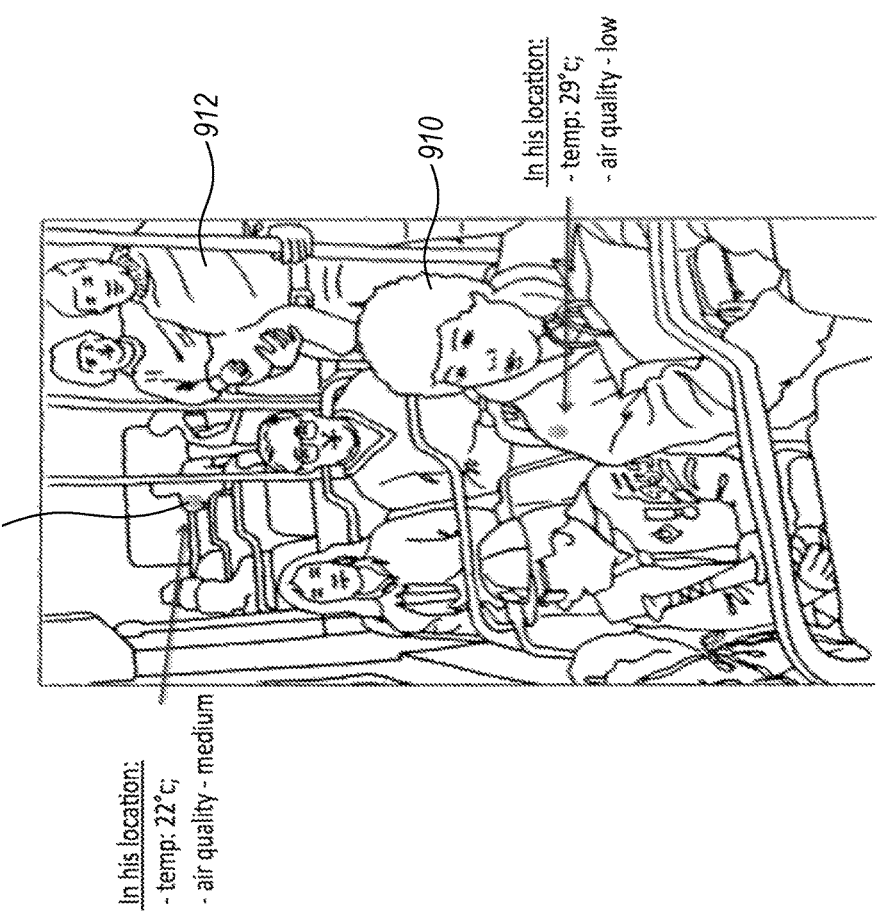
FIG. 9A, shows a bus with people wearing clothes with embedded targets, according to exemplary embodiments of the present invention.

FIG. 9A shows a bus carrying people wearing clothes with embedded targets, according to exemplary embodiments of the present invention. FIG. 9A shows targets, 910, 912 embedded in the clothes of bus passengers and a looker 905 embedded in the clothes of a different passenger. Targets 910 and 912 may become Lookers. The targets 910, 912 may transmit the data measured in their vicinity, and Lookers such as 905 located in the bus may determine the targets' 910, 912 relative location on the bus.

FIG. 9B shows two persons within a bus with targets embedded to their clothes, according to exemplary embodiments of the present invention. FIG. 9B shows targets 920 and 925 designed to measure environmental conditions, as shown in FIG. 9A. The targets 920 and 925, may transmit information regards the environmental conditions they measure to a Looker. Such Looker may be used to identify places within the bus which have some specific conditions a person may look for. For example, in case a person looks for a place within the bus where he or she has more room, or where the temperature is higher or lower. Thus, the person may utilize a Looker to receive information from targets 920, and 925, determine the environmental conditions and the relative direction to targets and present the information to the person.

Figure 10A:
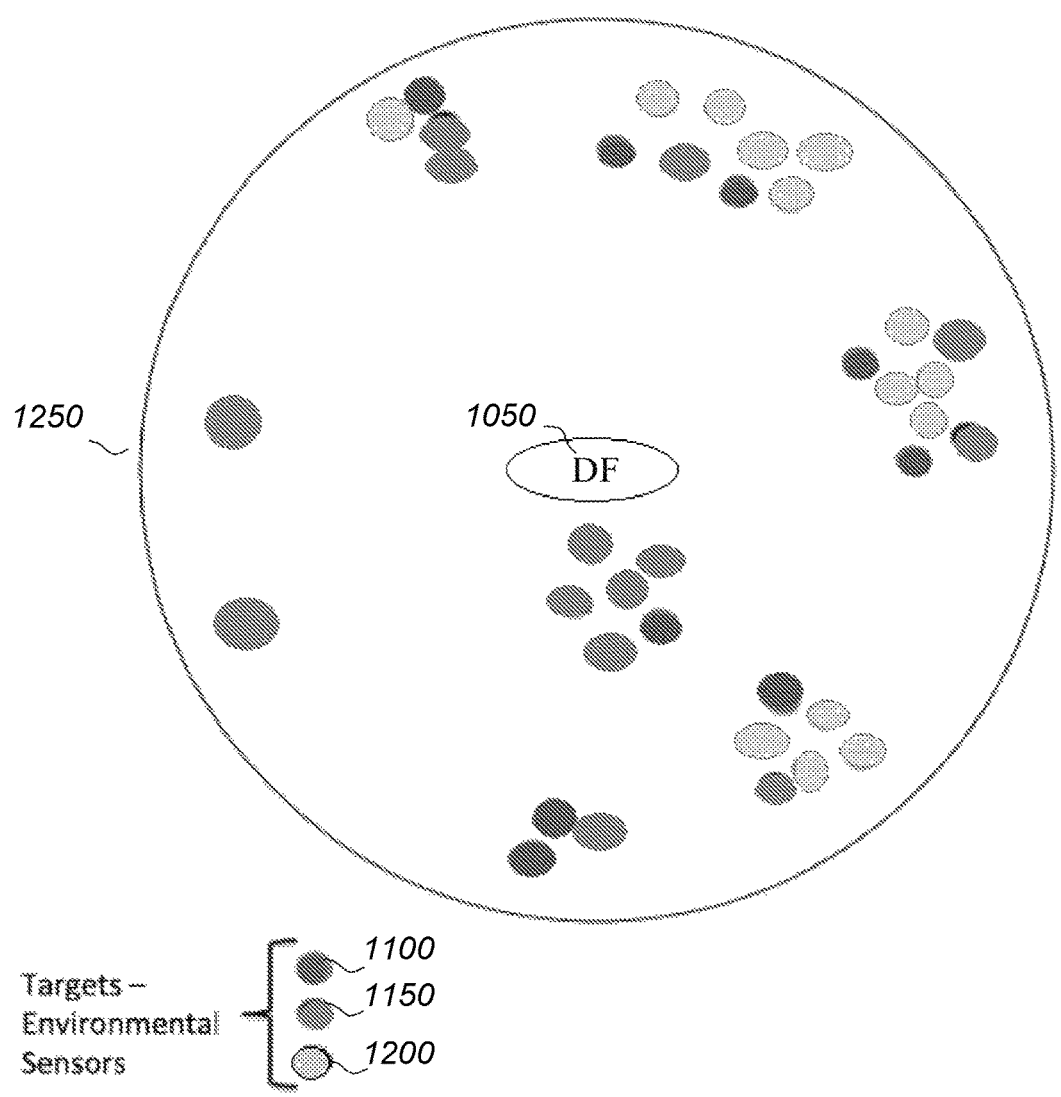
FIG. 10A, shows targets used to create a synoptic map of environmental conditions, according to exemplary embodiments of the present inventions; and, FIG. 10B, shows a synoptic layout created by direction finder, according to exemplary embodiments of the present invention.

FIG. 10A shows targets used to create a synoptic map of environmental conditions, according to exemplary embodiments of the present inventions. FIG. 10A shows an area 1250 comprising multiple targets embedded with multiple sensor types. Targets 1100, 1150 and 1200 are spread within area 1250. Looker 1050 is capable to detect the multiple targets and create a synoptic map of the environmental conditions and their relative positions. For example, the Looker 1050 may receive the temperature in the measured area from a plurality of targets located in different places with diverse environmental positions. Thus, Looker 1050 may create a 3-dimension layout of the temperature distribution in the measured area.

Figure 10B:
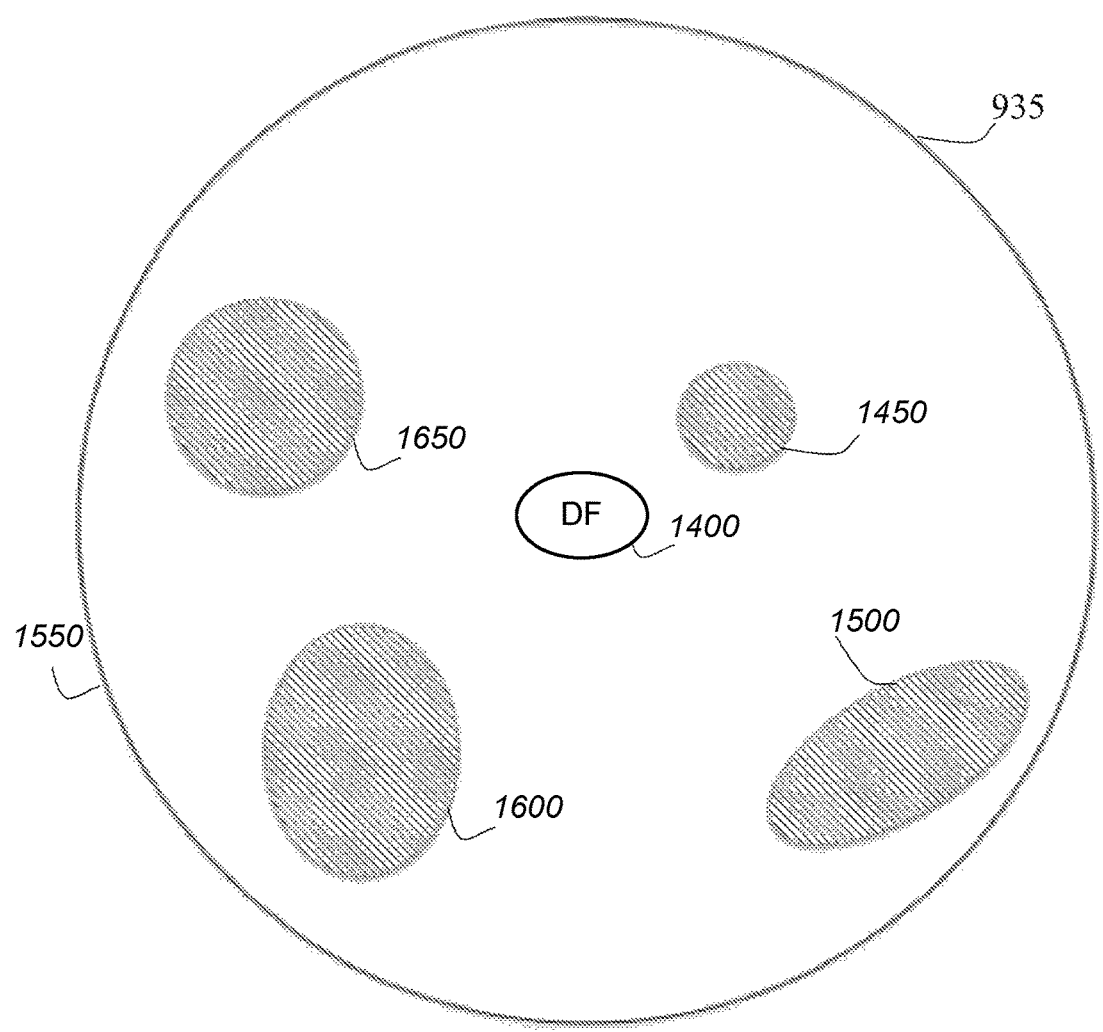

FIG. 10B shows a synoptic layout created by Looker, according to exemplary embodiments of the present invention. FIG. 10B shows Looker 1400 which receives information form targets spread in a measured area 1550. FIG. 10B also shows measured areas 1600, 1650, 1450 and 1500 which indicate on measured environmental conditions at these areas. For example, Looker 1400 can received information regards the level of noise in measured area 1550, and determine the relative positions of the targets transmitting the information. The Looker 1400 may be able to create a layout comprising the level of noise, the relative direction to the noisy areas, the height of the noise detector, the relative distance of the noisy area, and the like. In some cases, the direction finder may send the synoptic layout to a computerized system in order to create a visual layout of the measured area 1550. In some other cases, a computerized system may be able to integrate the information with a digital photo. Such integration may take place by utilizing diverse technologies such augmented reality.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

It is claimed that:
1. A method, comprising:
measuring, by a first device comprising at least one first environmental sensor, at least one environmental parameter using the at least one first environmental sensor of the first device to generate first environmental data;
initiating a direct wireless communication link between the first device and a second device;
transmitting, by the first device and via the direct wireless communication link, the first environmental data corresponding to the measured environmental parameter to the second device;
receiving, by the second device and via the direct wireless communication link, the environmental data from the first device;
determining, by the second device, a relative location of the first device relative to the second device;
associating, by the second device, the first environmental data and the relative location; and
generating, by the second device, a directional indication based on the received first environmental data and the relative location of the first device.

2. The method of claim 1, wherein the second device comprises at least one second environmental sensor, the method further comprising:
measuring, by the second device, second environmental data using the at least one second environmental sensor of the second device;
comparing the first environmental data received from the first device with the second environmental data measured by the second device; and
generating a recommendation to a user of the second device based on the comparison and the determined relative location.

3. The method of claim 1 wherein the first device comprises a plurality of first environmental sensors, the plurality of first environmental sensors including at least two of the following: an air temperature sensor, a light sensor, a noise level sensor, an air quality sensor, an air pressure sensor, a water temperature sensor, a water current speed sensor, a smoke sensor, an audio signature sensor, and a combination thereof.

4. The method of claim 1, further comprising:
tracking changes in environmental data associated with the at least one environmental parameter and changes in the relative locations of the first device and the second device; and
updating the directional indication based on the tracked changes.

5. The method of claim 1, wherein at least one first environmental sensor of the first device comprises a plurality of first environmental sensors, the method further comprising:
generating a real time display of environmental conditions measured by the plurality of first environmental sensors of the first device,
wherein the display of the environmental conditions comprises an indication of relative locations associated with respective measurements of the plurality of first environmental sensors.

6. The method of claim 5, further comprising:
tracking changes in environmental data associated with the plurality of first environmental sensors and changes in the relative locations of the first device and the second device; and
updating the display of the environmental conditions based on the tracked changes.

7. The method of claim 5, wherein the display of the environmental conditions comprises indications of the locations of each sensor of plurality of first environmental sensors and indications of a distance between each sensor of the plurality of first environmental sensors and the second device.

8. The method of claim 5, wherein the display of the environmental conditions comprises deviation values between received environmental data values and a corresponding environmental data value measured by a sensor in the second device.

9. The method of claim 5, wherein the display of the environmental conditions comprises an indication of a density of people based on a density of sensors.

10. The method of claim 5, wherein the display of the environmental conditions comprises a recommendation for user movement to a desired location based on environmental preferences.

11. The method of claim 5, further comprising:
filtering data corresponding to the environmental conditions based on a selected environmental parameter of the at least one environmental parameters,
wherein the display of the environmental conditions is generated based on the filtered data.

12. The method of claim 11, wherein the filtering is based on a difference between environmental condition values received from the plurality of first environmental sensors of the first device and at least one second environmental sensor of the second device.

13. The method of claim 1, further comprising:
comparing the first environmental data to a predefined threshold value associated with the at least one environmental parameter,
wherein generating the directional indication is based on the comparing.

14. The method of claim 13, wherein the directional indication comprising an alert when the first environmental data satisfies the predefined threshold value.

15. The method of claim 1, wherein relative location comprises a relative altitude of the first device relative to the second device.

16. The method of claim 1, wherein the second device communicates with a plurality of first devices, the method further comprising:
receiving, by the second device, environmental parameter preferences associated with the at least one environmental parameter; and
generating, by the second device, an indication of a target first device of the plurality of first devices based on the target first device measuring environmental data meeting the environmental parameter preferences.

17. The method of claim 1, wherein the second device shares the received first environmental data and relative location with at least one other second device.

18. The method of claim 1, wherein the at least one first environmental sensors comprises a voice sensor configured to identify a pre-defined sound or a pre-defined voice, and wherein the first environmental data comprises an emergency signal based on identification of the pre-defined sound or pre-defined voice.

19. A system comprising:
a first device comprising at least one first environmental sensor; and
a second device,
wherein the first device is configured to:
measure at least one environmental parameter using the at least one first environmental sensor of the first device to generate first environmental data;
initiate a direct wireless communication link between the first device and the second device; and transmit, via the direct wireless communication link, the first environmental data corresponding to the measured environmental parameter to the second device;

wherein the second device is configured to:
   receive, via the direct wireless communication link, the environmental data from the first device;
   determine a relative location of the first device relative to the second device;
   associate the first environmental data and the relative location; and
   generate a directional indication based on the received first environmental data and the relative location of the first device.

20. A second device, comprising:
one or more processors;
at least one second environmental sensor; and
memory storing instructions that, when executed by the one or more processors, cause the second device to:
   receive, from a first device comprising at least one first environmental sensors and via a direct wireless communication link, first environmental data corresponding to at least one environmental parameter and measured using the at least one first environmental sensor of the first device;
   determine a relative location of the first device relative to the second device;
   associate the first environmental data and the relative location;
   measure second environmental data using the at least one second environmental sensor;
   compare the first environmental data received from the first device with the second environmental data measured by the second device; and
   generate a recommendation to a user of the second device based on the comparison and the determined relative location.

* * * * *